United States Patent [19]

Hepler

[11] Patent Number: 5,213,824
[45] Date of Patent: May 25, 1993

[54] ADJUSTABLE HOT SPRUE BUSHING

[75] Inventor: Douglas C. Hepler, Rochester, N.Y.

[73] Assignee: Polyshot Corporation

[21] Appl. No.: 853,953

[22] Filed: Mar. 19, 1992

Related U.S. Application Data

[63] Continuation of Ser. No. 590,932, Oct. 1, 1990, abandoned.

[51] Int. Cl.⁵ .................................... B29C 45/20
[52] U.S. Cl. ............................ 425/549; 264/328.15; 425/567
[58] Field of Search ............... 425/547, 549, 567; 264/328.14, 328.15

[56] References Cited

U.S. PATENT DOCUMENTS

| | | | |
|---|---|---|---|
| 4,034,952 | 7/1977 | Stewart | 425/572 |
| 4,266,723 | 5/1981 | Osuna-Diaz | 425/549 |
| 4,273,525 | 6/1981 | Reitan | 425/549 |
| 4,309,163 | 1/1982 | Cottancin | 425/549 |
| 4,563,149 | 1/1986 | Landis | 425/549 |
| 4,593,182 | 6/1986 | Schwarzkopf | 425/549 |
| 4,666,396 | 5/1987 | Shaw | 425/549 |
| 4,882,469 | 11/1989 | Trakas | 425/549 |

*Primary Examiner*—Tim Heitbrink
*Attorney, Agent, or Firm*—Francis J. Caufield

[57] ABSTRACT

A highly reliable hot sprue bushing for use in controlling the temperature of plasticized material while it flows from the nozzle to the runner or sprue system in an injection molding machine. Advantageously, the hot sprue bushing is adjustable in length so that it can be used with a full range of standard or custom mold plate thicknesses or other required lengths.

14 Claims, 4 Drawing Sheets

ADJUSTABLE HOT SPRUE BUSHING

CROSS-REFERENCE TO RELATED APPLICATION

This application is a continuation of U.S. patent application Ser. No. 07/590,932 filed on Oct. 1, 1990 now abandoned.

BACKGROUND OF THE INVENTION

1. Field of the Invention

This invention in general relates to the field of injection molding and in particular to adjustable sprue bushings for conveying melted plastic from the nozzle to a mold cavity gate or runner system.

2. Description of the Prior Art

In plastic injection molding processes, a thermoplastic or thermoset molding compound is first heated to plasticity in an injection cylinder at controlled temperature. Afterwards, the plasticized compound is forced from the cylinder through a nozzle by means of pressure generated within the cylinder. On emerging from the nozzle, the plasticized compound is conveyed through a hole in a mold plate, usually stationary, by means of a sprue bushing (sprue for short) into the runner system or gate of the mold cavity. Once in the cavity, the resin, assumes the shape of the cavity, is cooled to the point where it is sufficiently solidified to retain the desired cavity shape. The mold is then opened, and the part ejected or otherwise removed. The entire process is usually automated with the clamping of the mold parts prior to injection and unclamping for part ejection or removal after cooling taking place under the control of a microprocessor or other form of automated controller. Machines are rated by the number of ounces they will inject per piston or screw stroke and by the square inches of working area that can be clamped against injection pressure. Consequently, a machine can be used to fabricate a variety of different sized parts up to its maximum capacity. This is accomplished by using, among other things, plates of suitable thickness for the part at hand; large working areas and high injection pressures calling for robust mold plates to mount and sustain the large stresses created during the molding cycle. Plates used to make small parts, on the other hand, can be scaled down in size in accordance with the reduced stresses generated while molding them. Parts between the largest and smallest obviously require intermediate sized plates, and the industry has adopted standard plate thicknesses to promote productivity.

For best process performance regardless of part size, it is known to be beneficial to control the temperature of the plasticized compound more or less constant throughout its travel to the cavity. This reduces process problems associated with material degradation due to thermal variability, improves yield by decreasing scrap losses, and increases machine production time by reducing down time due to freeze offs.

However, while standardized in many respects, particularly with respect to mold base or plate thicknesses, present molding machinery does not always provide for precise temperature control to take advantage of its beneficial effects. Indeed, much of the available machinery is still run employing cold sprue bushings which allow the temperature of the resin to be poorly controlled from the time it leaves the nozzle until it reaches a zone in the mold where temperature control is reacquired with, for example, internal heating channels in the mold.

More sophisticated practice, apparently not yet universally accepted, recognizes the advantages of controlling temperature by employing hot sprue bushings to convey material from the nozzle to the cavity gate often times through the fixed mold plate, sometimes referred to as the "A" plate or base. A variety of approaches for providing heat in these hot sprue bushings have been used. Among these are the use of resistive heating elements and heat pipes such as those described in U.S. Pat. No. 4,034,952 entitled "HOT PLASTIC INJECTION BUSHING" issued on Jul. 12, 1977. In the latter case, the heat pipes are used to transfer heat from electrically powered heater bands located at the nozzle end of the sprue bushing to regions along the bore near the tip.

The known commercially available hot sprue bushings, however, have a number of disadvantages in that molding shops need to acquire a variety of different sizes to match the range of standard "A" plate dimensions adopted by the industry for use in fabricating parts of different scale and it is expensive and time consuming to customize them. In addition, their reliability is impaired because of failures associated with tip breakage and heating performance.

Consequently, it is a primary object of this invention to provide a highly reliable hot sprue bushing that can easily be adapted for use with the full range of molding plate thicknesses or easily cutomized to meet the needs of specific jobs where there is not an exact match between off-the-shelf bushings and standard plate thicknesses.

It is another object of this invention to provide a hot sprue bushing for uniformly controlling the temperature of plasticized material while it travels from the nozzle to the mold cavity.

Other objects of the invention will in part be obvious and will in part appear hereinafter. A full understanding of the invention will best be had from reading the detailed description to follow in connection with the detailed drawings.

SUMMARY OF THE INVENTION

This invention relates generally to injection molding machinery and particularly to a highly reliable hot sprue bushing of adjustable drop length for controlling the temperature of plasticized material as it is conveyed through the stationary plate or plates of a mold from the nozzle to either the runner system or the cavity gate. The bushing in preferred form comprises a one-piece body of corrosion-resistant steel hardened to provide enhanced wear characteristics. Through the length of the body is an elongated, bore that is at least slightly tapered near its exit end for conveying the plasticized material. Surrounding the through bore are four, equally spaced electrical heating cartridges for maintaining its length under controlled temperature conditions. Temperature is monitored by a thermocouple located near the bushing tip.

The body has a threaded head near the nozzle end for receiving a series of spacing sleeves or collars adapted to permit adjustment of the effective bushing length to match either standard mold plate thicknesses or custom length requirements.

A removable cap of high heat conductivity mates with the body head to assure temperature control of nearby regions not directly heated by the cartridges.

Additionally, the cap, which is preferably fabricated of beryllium copper, provides the interface with the nozzle. For this purpose it has a recess whose geometry is shaped to complement that of standard nozzles.

At the nozzle end over the cap is a stainless steel bracket for holding and positioning wiring to ease handling and keep wiring clear of other molding equipment.

DESCRIPTION OF THE DRAWINGS

The structure and operation of the invention together with other objects and advantages thereof may best be understood by reading the detailed description in connection with the drawings wherein single reference numerals have been used throughout to designate the same part and wherein.

DETAILED DESCRIPTION

Figure 1:
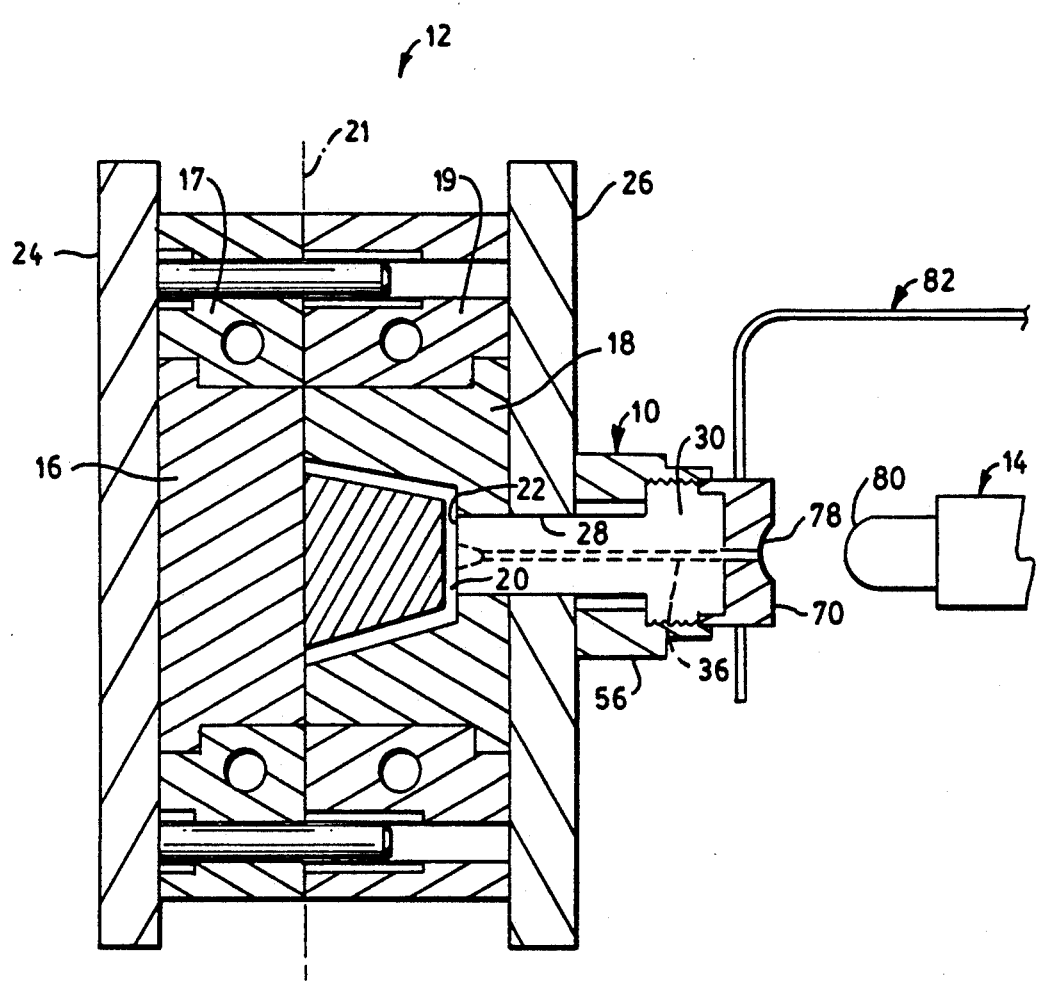
FIG. 1 is a diagrammatic cross-sectional view of the invention shown in conjunction with the principal parts of a simple center-gated injection mold.

Referring now to FIG. 1, the inventive hot sprue bushing, designated at 10, is shown in operative relationship with a simple center-gated injection mold 12 and a portion of a nozzle 14 from the front end of, for example, a reciprocating screw injection cylinder (not shown) in which either thermoplastic or thermoset materials are plasticized for travel through the orifice of nozzle 14.

Mold 12 comprises a force block 16 and cavity block 18 which between them form a cavity 20 in the shape of the part to be molded. Entrance to cavity 20 is by way of an orifice 22 referred to as the cavity gate.

Force block 16 is fixedly mounted to a back-up mold mounting plate 24 via a retainer plate 17 and cavity block 18 to a cavity retainer or stationary plate 26 via a retainer plate 19. During the injection molding process, plates 24 and 26 are physically held in place against one another by clamping as with, for example, well-known hydraulically powered clamping arrangements (not shown) and in turn retain the cavity defining halves of mold 12 together under the injection pressure.

Once the plasticized material solidifies, plate 24 is customarily moved to break the mold at parting line 21, and the part is either removed or ejected. Plate 26 usually remains stationary during this process and hence may be referred to as a stationary plate and is also called a top clamping plate whose thickness has been standardized by industry practice where the different thicknesses have been adopted to match different loadings generated while injecting parts of different size and projected area.

Connecting the cavity gate 22 and the orifice of nozzle 14 is the inventive hot sprue bushing 10 which can be adjusted in the manner to be described for use with either standard stationary plate thicknesses, stationary plates of custom thickness, or other custom lengths while also controlling temperature of the plasticized material traveling through it. Hot sprue bushing 10 fits through either a standard three-quarter or one inch diameter hole 28 through stationary plate 26 for this purpose.

Figure 2:
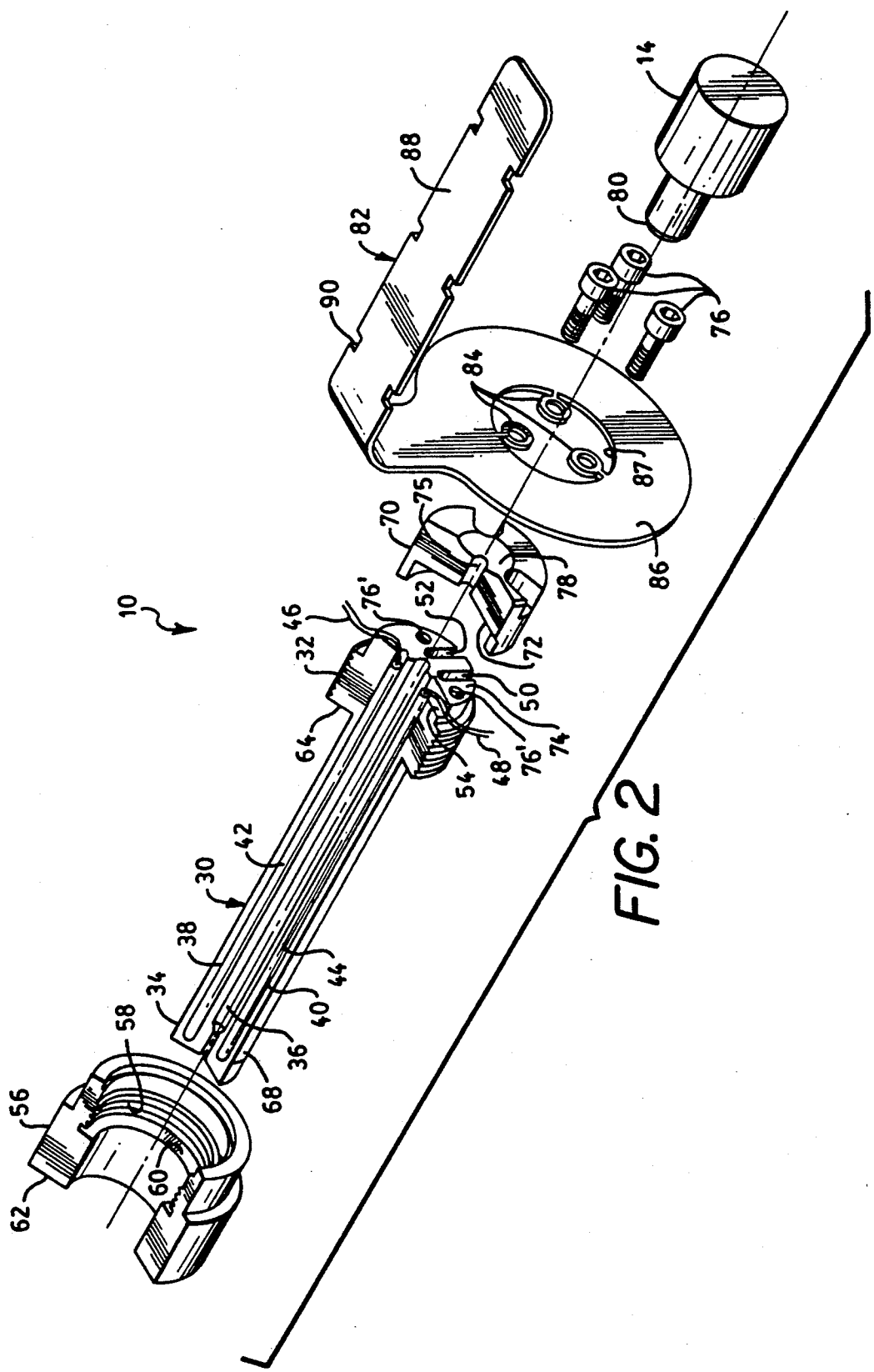
FIG. 2 is an exploded perspective of the hot sprue bushing of the invention shown with parts broken away.

Referring now to FIG. 2, hot sprue bushing 10 can be seen to comprise a body 30 made of a single piece of corrosion resistant steel that is preferably hardened to the same level of stationary plates and mold halves to enhance its wearing characteristics and improve reliability of operation.

At the nozzle end of body 30 is a threaded, enlarged head 32 while opposite it, near the mold end, is a tip 34. Extending the length of body 30 is an elongated through bore 36 that is slightly tapered outwardly, at least near tip 34, toward mold 12 to promote easy release of parts. Plasticized material emerging from nozzle 14 is conveyed to cavity gate 22 via bore 36.

Surrounding bore 36 are four equally spaced holes (one of which is shown at 38) arranged radially at 90-degrees to one another. Holes 38 are dimensioned to extend substantially the length of central bore 36 and receive resistive heating cartridges such as that designated typically at 42. Heating cartridges 42 are placed so that, when powered, they preferably provide uniform heating of central bore 36 throughout its length to mitigate against adverse processing conditions related to uncontrolled temperature variations. While uniform temperature is desirable, those skilled in the art will recognize that there may be conditions for a controlled variation in temperature along the length of bore 36, and this may be provided by a nonuniform distribution of the heating coils of cartridges (42).

To monitor the temperature of bushing 10, a bore 40 is provided to receive a thermocouple 44 that resides preferably near body tip 34. Located at tip 34, this position, nearest the cooling system of mold 12, is believed to be optimal for temperature sensing because this is the region of body 30 which is most likely to experience the highest heat loss and, therefore, should be the monitoring point to assure that all points forward of nozzle 14 are sufficiently heated. Locating the temperature sensor at, for example, the nozzle end would assure that it only was at the desired temperature while allowing for the possibility of a cooler tip end, an undesirable situation. In this manner, the tip is held at the desired temperature, even though at the highest point of heat loss, thus reducing the possibility for freeze-off, a condition in which plasticized material solidifies upstream of the gate requiring machine down time to clear. With the tip always at the desired temperature, freeze-off can be greatly reduced and with the aid of "suck back", the creation of a partial vacuum with the reciprocating plasticizing screw, it can, within limits, almost be eliminated.

Wires from heating cartridges 42, which are designated typically at 46, are led safely out of rear surface 74 of head 32 via relief slots, two of which are shown at 50 and 52, while the wire from thermocouple 44, shown at 48, is led from head 32 via a relief slot 54.

Figure 3:
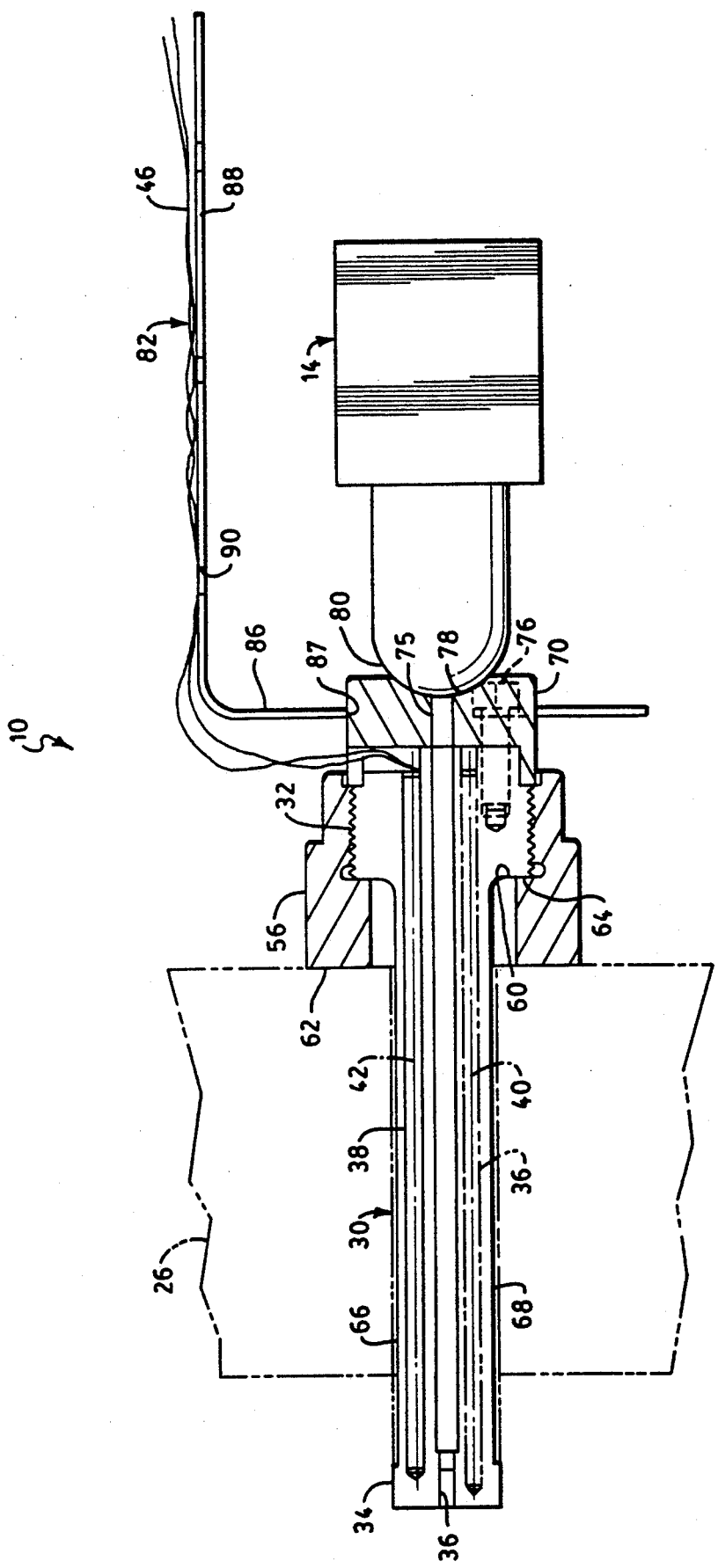
FIG. 3 is a cross-sectional view shown in conjunction with a stationary mold plate as from FIG. 1 along with a fragment of a nozzle.

The "drop length" of bushing 10 or, more particularly, the distance from the nozzle side surface of stationary plate 26 where it mates with front surface 62 of collar 56 as best seen in FIG. 3 to the front surface of body tip 34, where it mates with cavity gate 22 or, perhaps, a runner system, can be adjusted to the needs of a particular molding job through the use of threaded sleeves or collars such as that designated at 56. These sleeves 56 are made to different standard lengths and are provided with a threaded hole 58 to engage complementary threads on head 32. However, they can also easily be provided inexpensively in custom lengths to match the particular needs of any molding task. When a sleeve 56 screwed to head 32, a reference surface 60 in the bottom of threaded hole 58 mates with bottom surface 64 of head 32, snugly seating against it, to define the drop length.

Figure 4:
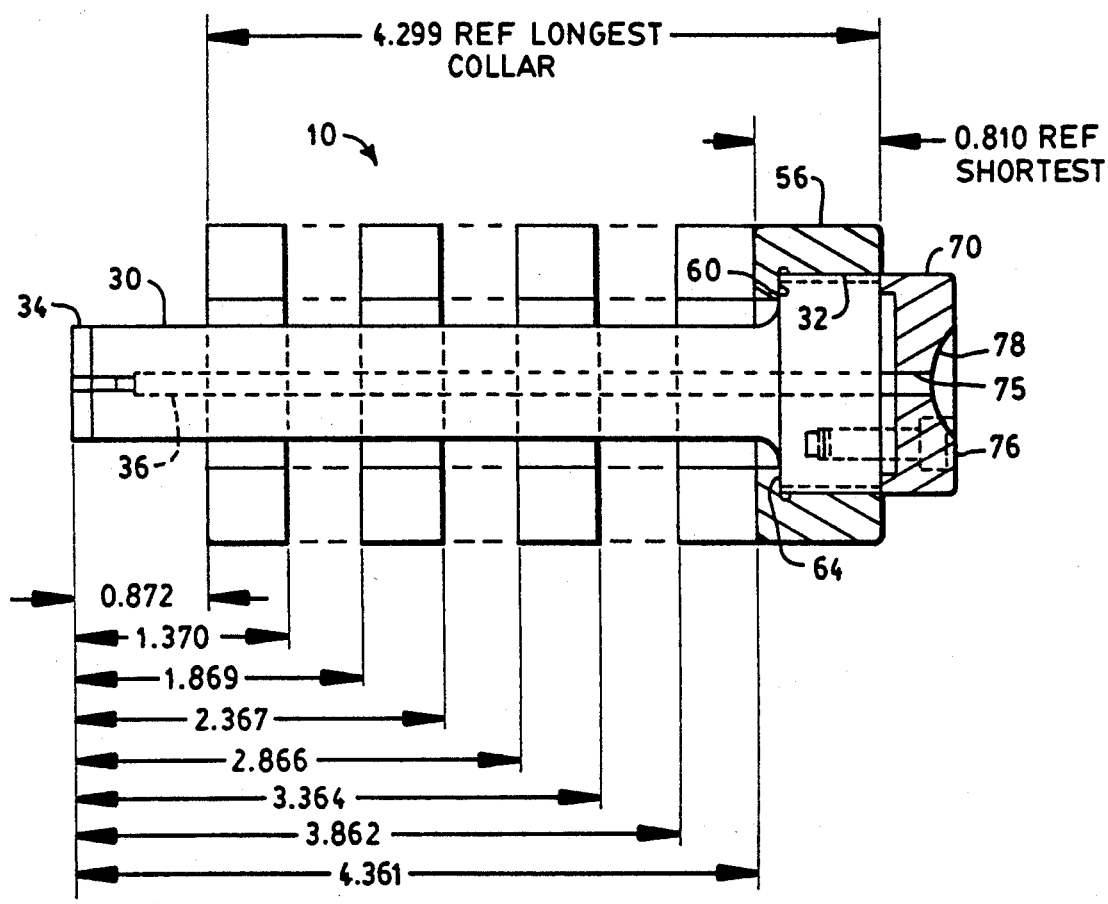
FIG. 4 is a partially sectioned, elevational view of the inventive hot sprue bushing showing a plurality of spacing collar lengths for matching standard mold plate thicknesses.

Sleeves 56 are also preferably made of stainless steel and preferably come in the standard lengths shown in FIG. 4, ranging from a shortest of 0.810 inches to a longest of 4.299 inches but, obviously, could be made to any desirable length if nonstandard lengths were required. The lengths of sleeves 56 are also set in a well-known manner to account for the thermal coefficient of expansion of the material from which they are fabricated and the expected temperature environment in which they will are to be used.

Consequently, the use of a series of standardized "drop length" sleeves with a single-piece body 30 provides users with a simple means for reducing bushing inventory and enhances reliability since there are no breakage prone screw-on tips to contend with. This interchangeability also solves the lead time problems encountered while awaiting a bushing delivery not in inventory. Hence, part delivery time is greatly improved.

To prevent heat conduction between the outer surfaces of body 30 and the inner surfaces of stationary plate hole 28 or the surfaces of the cavity block 18 extending from the front surface of plate 26 to cavity gate 22, the diameter of the tip of body 30 is, for a short distance, made slightly larger than that of the remainder of body 30 extending rearwardly to reference surface 64. Thus structured, when bushing 10 is mounted in mold 12, air relief gaps 66 and 68 are formed. Gaps 66 and 68 will vary in length depending on the length of sleeve 56 in use but, in any event, form a gap of nonconducting air around substantially the entire length of body 30, insulating it from the possible heat loss to its otherwise intimate surroundings.

Near the nozzle end of body 30 a heat conducting cap 70 is provided for attachment to head 32. Cap 70 is preferably formed of a material of high heat conductivity such as beryllium copper. The material marketed by Brush Wellman, Inc. under the tradename Protherm has been found suitable for this purpose.

The method for attaching cap 70 is via three cap screws 76 which enter corresponding holes 76' located in head 32. Cap 70 is provided with a well finished surface 72 which snugly seats against the rear surface of head 32 to create intimate contact with it for purposes of assuring high heat conduction between body 30 and cap 70 since cap 70 is not directly heated via electric heating cartridges 42. In this manner, cap 70 assures that the short orifice through it, indicated at 75, is maintained at or near the same temperature as that of through bore 36.

A spherical recess 78 is provided in the rear end of cap 70 to mate with front end of nozzle 14 designated as 80. Since cap 70 is easily removable, recess 78 can be provided in a number of different geometries to match those of available standard nozzles.

A bracket 82, preferably of stainless, is provided for ease of handling and to hold and position wiring away from surrounding molding equipment. Bracket 82, which is made of thin sheet stock, has a circular section 86 provided with stamped out hole 87 having a series of tabs typically shown at 84, also provided with holes. At ninety degrees to section 86 is a rearwardly extending arm 88 having a series of notches typically shown at 90 for the purpose of securing wiring. Bracket 82 bolts to head 32 via screws 76, and nozzle 14 gains access to recess 78 via hole 87.

The foregoing inventive structure, in addition to its versatility, has been found highly reliable having been able to mold millions of parts without failure. Scrap losses also have been remarkably reduced especially in molding small parts where the material lost to freeze-offs can be significant compared with part volumes. Those skilled in the art may make changes to the invention without departing from the scope of its teachings. Therefore, it is intended that the embodiments described above be considered as illustrative and not be construed in a limiting sense.

What I claim is:

1. A hot sprue bushing adjustable in drop length so that it can be used in injection molding machines with a full range of different mold plate thicknesses to transport plasticized material from injection nozzles to mold cavities while controlling the temperature thereof, said hot sprue bushing comprising:

an elongated body of given length having arranged in order along its length a head, a stem, and a tip, said head having a reference seating surface which faces said tip and a rear surface facing opposite said tip, the distance between said reference seating surface and said tip corresponding to an initial drop length of said elongated body, said elongated body having a through bore passing from end to end through said head, stem, and tip thereof for transporting plasticized material through said hot sprue bushing from said head to said tip thereof, said elongated body having at least one nonthrough bore extending alongside said through bore, in heat conducting relationship with respect thereto, and adapted to receive an electrically powered heating cartridge for controlling the temperature of plasticized material as it travels along said through bore, said nonthrough bore having a length which extends from said head rear surface, through said head and said stem and into said tip by a predetermined distance, said length of said nonthrough bore being shorter than said given length of said elongated body; and changing means manually positionable against said reference seating surface of said head and between said reference seating surface of said head and said tip for shortening said initial drop length of said elongated body, said changing means having a mold plate seating surface selectively locatable over a predetermined range of distances between said reference seating surface and said tip to change the drop length of said hot sprue bushing, the changed drop length of said hot sprue bushing corresponding to the distance between said mold plate seating surface of said changing means and said tip.

2. The hot sprue bushing of claim 1 wherein said changing means comprises a series of interchangeable spacing sleeves of different length for separate use with said elongated body.

3. The hot sprue bushing of claim 2 wherein said interchangeable spacing sleeves are adapted to releasably attach around predetermined portions of said elongated body to change the drop length of said hot sprue bushing, each of said spacing sleeves being of shorter length than said initial drop length of said elongated body and including said plate seating surface which, when said sleeves are attached to said elongated body, faces said tip, said head and each of said spacing sleeves having complementary attachment means for releasably attaching a sleeve with said head of said elongated body, butted against said head reference seating surface, the distance between said plate seating surface of a sleeve and said tip of said elongated body corresponding to said changed drop length of said hot sprue bushing.

4. The hot sprue bushing of claim 1 wherein said elongated body is fabricated of a single piece of material.

5. The hot sprue bushing of claim 4 wherein said material comprises steel.

6. The hot sprue bushing of claim 5 wherein said steel is hardened.

7. The hot sprue bushing of claim 1 wherein said at least one nonthrough bore comprises four bores for receiving four heating cartridges, said four bores being equally spaced around said through bore of said elongated body.

8. The hot sprue bushing of claim 1 further comprising a cap, said cap and said head of said elongated body being complementary configured so that said cap removably attaches to said head of said hot sprue bushing, in heat conducting relationship therewith, and has a recess having a shape complementary to that of standard nozzle shapes.

9. The hot sprue bushing of claim 8 wherein said cap is fabricated of high heat conductivity material.

10. The hot sprue bushing of claim 9 wherein said heat conducting material comprises beryllium copper.

11. The hot sprue bushing of claim 1 further comprising yet another bore adapted to receive and position a temperature sensor substantially at said tip of said elongated body for controlling the temperature of said through bore over its full given length.

12. The hot sprue bushing of claim 1 further comprising a bracket mounted to said head for supporting, positioning, and protecting electrical wiring from surrounding molding equipment, said bracket having one section that extends radially outward from said head and another section depending from said one section and extending rearwardly from said head.

13. The hot sprue bushing of claim 1 wherein one of said initial and said changed drop length corresponds to at least one selected from standard mold plate thicknesses.

14. The hot sprue bushing of claim 2 wherein said head of said elongated body and said spacing sleeves are adapted to releasably screw and unscrew to one another for changing said initial drop length.

* * * * *